(12) United States Patent
Postlethwaite et al.

(10) Patent No.: US 10,653,052 B2
(45) Date of Patent: May 19, 2020

(54) WHEEL TRACK RENOVATOR AND METHOD OF USE

(71) Applicant: TYNAB PTY LTD, Coonooer (AU)

(72) Inventors: Neale Postlethwaite, Coonooer (AU); Trevor Postlethwaite, Coonooer (AU)

(73) Assignee: TYNAB PTY LTD, Coonooer Vic (AU)

( * ) Notice: Subject to any disclaimer, the term of this patent is extended or adjusted under 35 U.S.C. 154(b) by 0 days.

(21) Appl. No.: 15/559,006

(22) PCT Filed: Mar. 16, 2016

(86) PCT No.: PCT/AU2016/050187
§ 371 (c)(1),
(2) Date: Sep. 15, 2017

(87) PCT Pub. No.: WO2016/145490
PCT Pub. Date: Sep. 22, 2016

(65) Prior Publication Data
US 2018/0092284 A1    Apr. 5, 2018

(30) Foreign Application Priority Data
Mar. 16, 2015    (AU) .................. 2015900935

(51) Int. Cl.
*A01B 37/00* (2006.01)
*A01B 35/28* (2006.01)
*E02F 5/12* (2006.01)

(52) U.S. Cl.
CPC .............. *A01B 37/00* (2013.01); *A01B 35/28* (2013.01); *E02F 5/12* (2013.01)

(58) Field of Classification Search
CPC ............ A01B 37/00; A01B 35/28; E02F 5/12
See application file for complete search history.

(56) References Cited

U.S. PATENT DOCUMENTS

| | | | | | |
|---|---|---|---|---|---|
| 3,375,878 | A | * | 4/1968 | Dorn ..................... | E02F 3/06 172/119 |
| 3,876,013 | A | * | 4/1975 | Dunn .................... | A01B 31/00 172/119 |
| 3,934,363 | A | * | 1/1976 | McMurray ............. | E02D 17/12 37/351 |
| 3,999,314 | A | * | 12/1976 | Miller ..................... | E02F 3/78 37/382 |
| 4,073,245 | A | * | 2/1978 | Anderson .............. | A01B 13/16 111/133 |
| 4,678,365 | A | * | 7/1987 | Ban ........................ | E01C 19/187 404/101 |

(Continued)

FOREIGN PATENT DOCUMENTS

| WO | 1988000002 A1 | 1/1988 |
|---|---|---|
| WO | 2007126890 B1 | 1/2008 |

OTHER PUBLICATIONS

International Search Report and Written Opinion issued in PCT/AU2016/050187, dated Jun. 9, 2016, 9 pages.

*Primary Examiner* — Jamie L McGowan
(74) *Attorney, Agent, or Firm* — Hamilton, Brook, Smith & Reynolds, P.C.

(57) ABSTRACT

A wheel track renovator including a body attachable to a device, one or more augers mounted to the body and at least one drive connected to the one or more augers to drive the one or more augers.

14 Claims, 7 Drawing Sheets (56) References Cited

U.S. PATENT DOCUMENTS

| | | | | |
|---|---|---|---|---|
| 4,778,305 A * | 10/1988 | Ritchey | E01C 19/405 404/101 |
| 4,912,862 A * | 4/1990 | Bishop | E02F 5/226 171/123 |
| 4,948,292 A * | 8/1990 | Haven | E01C 19/008 404/118 |
| 5,073,063 A * | 12/1991 | Brown | E01C 19/463 404/101 |
| 5,353,529 A * | 10/1994 | McCullough | E02F 5/223 172/43 |
| 5,405,214 A * | 4/1995 | Campbell | E01C 19/48 404/105 |
| 5,479,728 A * | 1/1996 | Deken | E02F 5/226 172/155 |
| 5,529,434 A * | 6/1996 | Swisher, Jr. | E01C 19/48 404/108 |
| 5,531,542 A * | 7/1996 | Willis | E01C 19/405 404/101 |
| 5,533,829 A * | 7/1996 | Campbell | E01C 19/174 404/108 |
| 5,586,731 A * | 12/1996 | Glaze | B01F 3/06 172/119 |
| 5,845,717 A * | 12/1998 | Gillespie | A01B 37/00 172/833 |
| 5,857,804 A | 1/1999 | Musil | |
| 5,980,153 A * | 11/1999 | Plemons | E01C 19/185 198/657 |
| 6,086,287 A * | 7/2000 | Sharpe | E01C 19/4873 404/101 |
| 6,434,861 B1 * | 8/2002 | McCullough | E02D 17/12 37/142.5 |
| 6,582,152 B2 * | 6/2003 | Leone | E01C 19/42 404/105 |
| 6,820,358 B1 * | 11/2004 | Huelsewiesche | A01K 31/04 172/119 |
| 7,484,911 B2 * | 2/2009 | Frelich | E01C 19/48 222/71 |
| 8,256,986 B2 * | 9/2012 | Casters | E01C 19/40 404/104 |
| 9,551,115 B2 * | 1/2017 | Engels | G06T 7/20 |

* cited by examiner

WHEEL TRACK RENOVATOR AND METHOD OF USE

FIELD OF THE INVENTION

This invention relates to a wheel track renovator and associated method of use. In particular the invention relates to the filling in of agricultural traffic lanes created by controlled traffic farming. However, it should be appreciated that the wheel track renovator may be used for other purposes such as smoothing ruts in dirt roads.

BACKGROUND OF THE INVENTION

Controlled traffic farming is a management tool which is used to reduce the damage to soil caused when heavy or repeated agricultural machinery passes on the land. Controlled traffic farming is a system which confines all machinery loads to the least possible area through the use of permanent tracks.

However, after several years of controlled traffic farming, the soil structure usually changes considerably. The soil becomes softer and friable which is good for growing plants, but can cause issues with trafficability. When wheeled traffic passes over the same place repeatedly, the soil, over time, slumps down in the bottom of the track and oozes out and up on each side. The problem with having tracks in a field is that the track is often too deep to plant seed. Further, when the tracks become waterlogged, they become impassable for normal paddock operations.

Several manufacturers have attempted to build machines to fill tracks created by agricultural machinery passing down traffic lanes. Most of these vehicles use a series of inclined discs mounted to a frame or a simple grader blade. The discs are inclined so that when they are pulled behind an agricultural vehicle, the discs dig into the ground thereby shifting soil from outside of the traffic lane into the traffic lane. The discs are typically freewheeling and are rotated by contact with the ground. The discs are angled toward the traffic lane with discs located on each side of the traffic lane being inclined toward each other. Unfortunately there are limitations to the discs which primarily produce filled tracks that are uneven, cloddy and are not sufficiently compacted.

OBJECT OF THE INVENTION

It is an object of the invention to overcome and/or alleviate one or more of the above disadvantages or provide the consumer with a useful or commercial choice.

SUMMARY OF INVENTION

In one form, although not necessarily the only or broadest form, the invention resides in a wheel track renovator comprising:
 a body attachable to a vehicle;
 one or more augers mounted to the body; and
 at least one drive connected to the one or more augers to drive the one or more augers.

The body typically includes a frame to which are mounted the one or more augers.

The body usually includes a pair of packing wheels. The packing wheels are typically located behind the frame. The packing wheels may have tyres. The tyres may include a tread.

The body may also include a first pair of support wheels. The first pair of support wheels may be located in front of the frame. The body may include a second pair of support wheels. The second set of support wheels may be located behind the first pair of support wheels.

The support wheels may be fixed in position with respect to the frame. Alternatively, the support wheels may be pivotally mounted to the frame.

The frame may be towed behind a vehicle. Alternatively, the frame may be connected to the vehicle via a three point linkage.

Each auger typically has at least one screw. However, normally there are at least two screws on each auger.

Normally each auger is angled perpendicularly with the direction of travel. However, it should be appreciated that each auger may inclined with respect to the direction of travel. For example, an auger may be included at 30, 45 or 60 degrees with respect to the direction of travel.

Normally there is an even number of screws on each auger. The auger may have one screw, two screws, fours screws, six screws or eight screws on each auger.

A space is normally located between each pair of screws. In each pair of screws, a first screw may be a counter-clockwise screw whilst a second screw may be a clockwise screw. That is, when the screws are rotated, they rotate toward the space.

Normally there are two least augers. Each auger normally has two screws. That is, there are two pairs of screws with two associated spaces, each space located between each pair of screws.

Alternatively, it is envisaged that there are four augers each with a single screw. In this arrangement, there are still two pairs of screws with two associated spaces, each space located between each pair of screws. These could be arranged beside each other or alternatively one behind each other in a second or third row of augers.

Still alternatively, there may be one auger with four screws. Preferably, each auger may have two screws. In this arrangement, there are still two pair of screws with two associated spaces, each space located between each pair of screws.

The one or more augers typically rotate in reverse compared to the direction of travel of the body.

Typically the drive is in the form of a motor. Typically the motor is in the form of a hydraulic drive. The hydraulic drive may be powered from a hydraulic system of an agricultural vehicle such as a tractor. Alternatively, the motor may be powered via a power take off from an agricultural vehicle such as a tractor.

A smoothing device may be located between two screws of the soil movement device. The smoothing device may be in the form of a series of paddles that extend outwardly from a shaft of the auger at the space between a pair of screws. Alternatively, the smoothing device may be in the form a series of bars. The bars may extend between two screws over the space between the augers.

A prickle chain may be attached to and located behind the body.

In another form, the invention resides in a method of filling in tracks, the method including the step of:
 moving the soil from one side of a track into the track using one or more mechanically rotated augers.

The method may further include the step of moving soil from both sides of a track into the track using one or more mechanically rotated augers.

Normally the one or more augers have two screws which move the soil toward the track.

Further details of the invention will become apparent.

DETAILED DESCRIPTION OF PREFERRED EMBODIMENT

Figure 1:
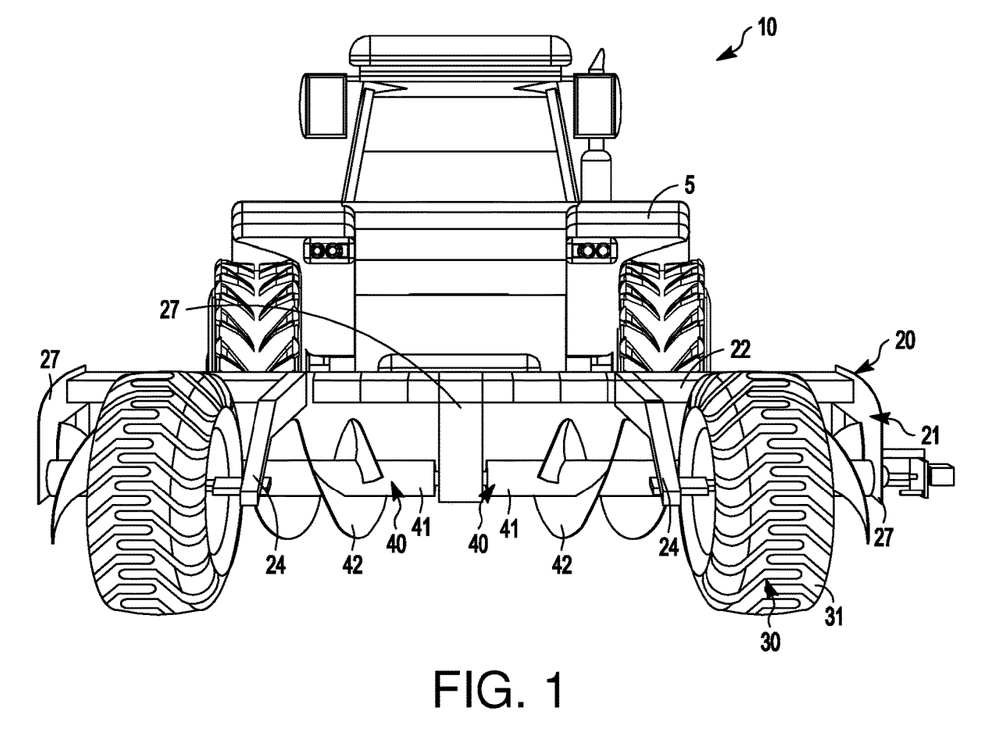
FIG. 1 is a perspective view of a wheel track renovator according to a first embodiment of the invention.
Figure 2:
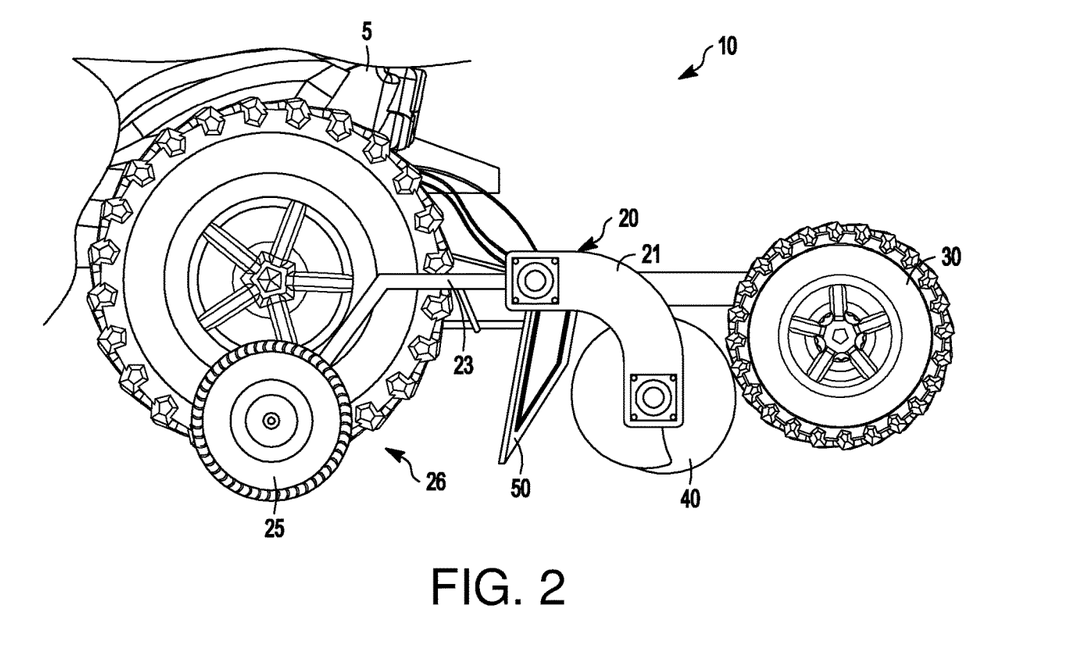
FIG. 2 is a side view of a wheel track renovator according to a first embodiment of the invention.

FIGS. 1 and 2 show a wheel track renovator 10 that is used to fill in tracks that are caused by controlled traffic farming. The wheel track renovator 10 is towed behind a tractor 5. The wheel track renovator includes a body 20, a pair of packer wheels 30, a pair of augers 40 and a drive mechanism 50.

The body 20 is formed from a frame 21. The frame includes a central member 22 from which extend a pair of fixed support wheel mounting arms 23 and a pair of fixed packing wheel arms 24. The support wheel mounting arms 23 are located adjacent the ends of the central member 22 and extend outwardly from the central member 22. The support wheel mounting arms 23 are used to mount support wheels 25. The support wheels 25 and the support wheel mounting arms form a support assembly 26.

The packing wheel arms 24 extend rearwardly from the central member 22. The packing wheel arms 24 are used to mount the packing wheels 30. The packing wheels 30 include large flotation tyres 31 that both compress the track and provide stability.

Three auger mounting arms 27 extend outwardly from the central member 22 to rotatably mount the pair of augers 40.

Each auger 40 is constructed from a central shaft 41 which is used to mount two separate helical screws 42. The first screw is a counter-clockwise screw whilst the second screw is a clockwise screw. Removable wear plates (not shown) are attached to the screws 42 and can be replaced as required.

Figure 3:
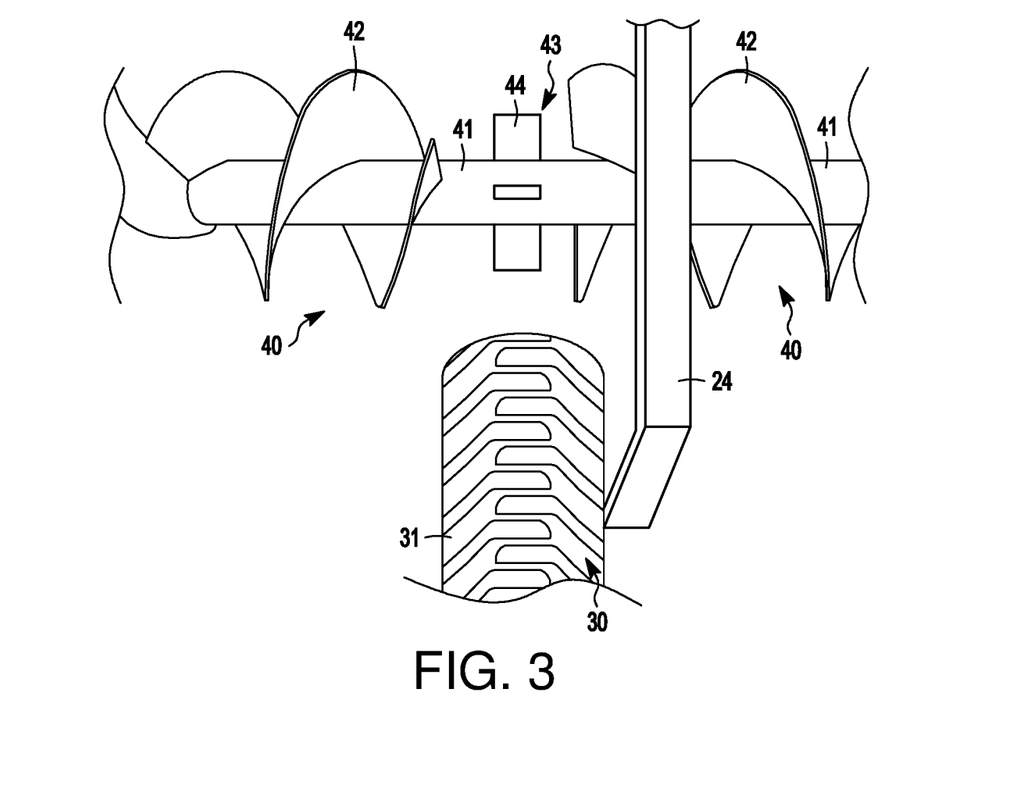
FIG. 3 is a top view of a wheel track renovator according to a first embodiment of the invention.

The two screws 42 on each auger 40 are spaced from each other on the shaft 41 to form a space 43 as shown in FIG. 3. A series of paddles 44 are located in the space. The paddles extend outwardly from the shaft 41 and are equally circumferentially spaced around the shaft 41.

A series of shields 50 are located behind the augers 40 to prevent dust, rocks and other debris from being flicked onto the tractor. It would be appreciated that shields 50 are often placed in front of the augers also to prevent access to the augers during operation for safety. The shields 50 are mounted to the central member 22 of the frame 21 and extend downwardly adjacent the augers 40.

Figure 4:
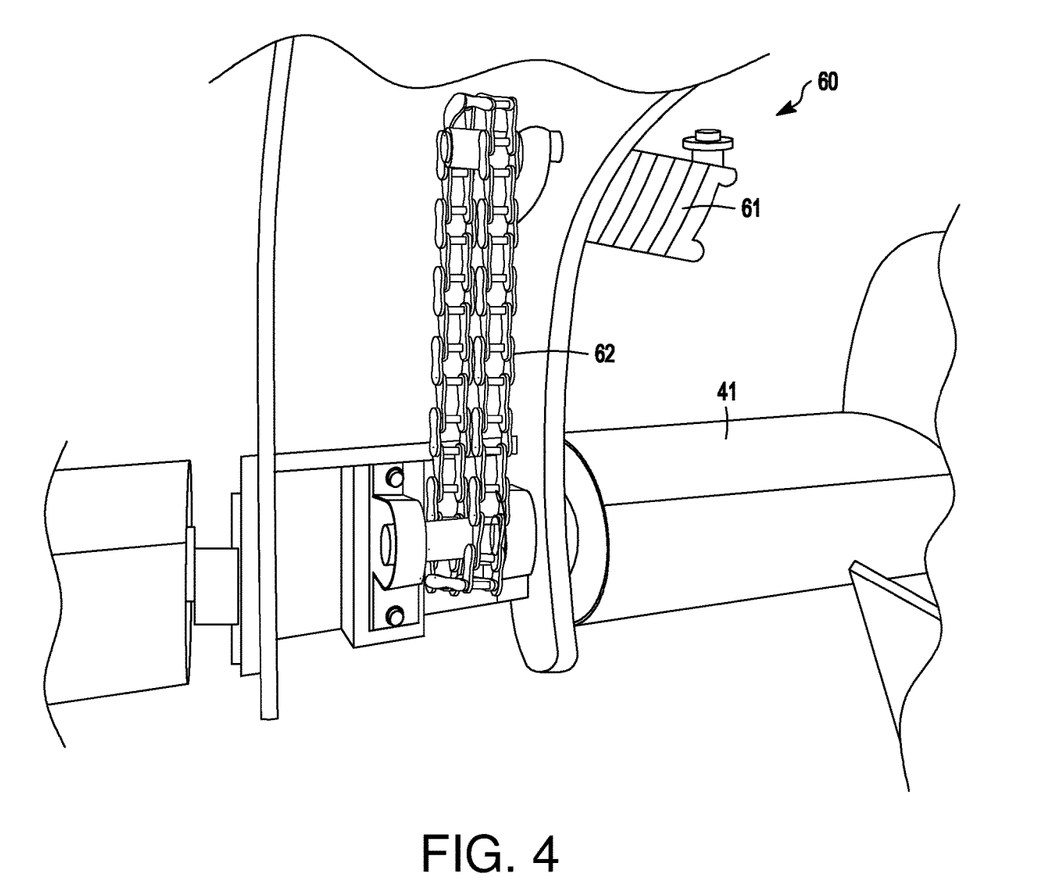
FIG. 4 is a perspective view of the drive mechanism according to a first embodiment of the invention.

The drive mechanism 60 includes a hydraulic motor 61 which is located on the central beam of the frame 21. The hydraulic motor 61 is attached to the shaft 41 of the auger via a chain 62 as shown in FIG. 4. The chain 62 passes through an oil bath (not shown). The hydraulic motor 61 is connected to the hydraulic system of the tractor 5 as shown in FIG. 1. The hydraulic motor 61 rotates the augers via the chain 62 in a direction that is opposite to the direction travel of the tractor 5. The auger 40 typically rotates at between 130 rpm to 200 rpm depending on soil conditions.

In use, the tractor 5 is driven down a track that is to be filled with soil. The support wheels 25 are located outside the track and are positioned at the desired level of the soil. It should be noted that the middle of the track is lower that the desired level of the soil whilst the soil adjacent the track is higher than the desired level of the soil.

Figure 5:
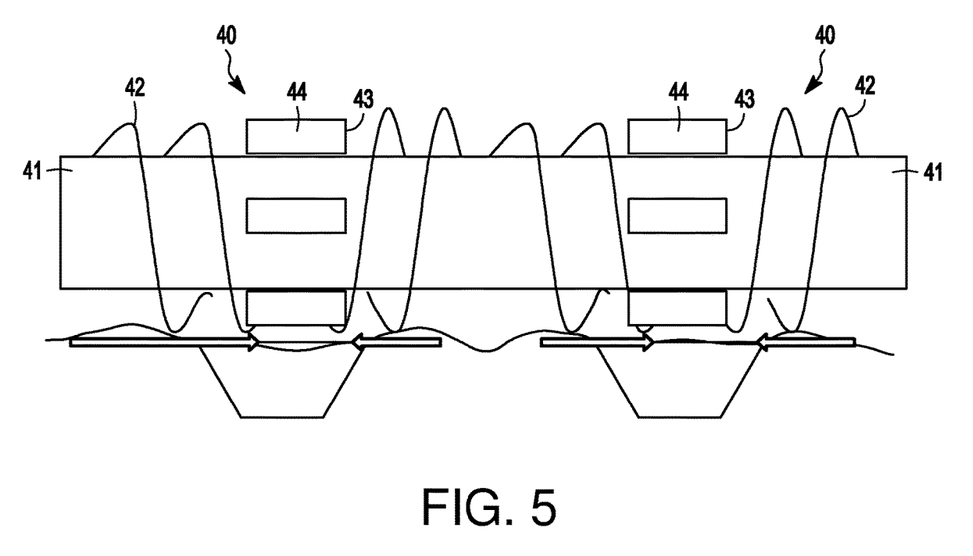
FIG. 5 is a schematic view of the operation of the augers according to a first embodiment of the invention.

The hydraulic motor 61 is started and causes rotation of the augers 40 in a direction that is reverse the direction of travel. Each auger 40 contacts the soil that is located about the track and above the desired soil level and causes soil on both sides of a track to be moved in toward the centre of the auger 40 as shown in FIG. 5. The soil then moves into the space 43 between the screws 42 and falls into the track. The paddles 44 then smooth the soil longitudinally. The packing wheels 30 then compress the soil located within the track.

The correct speed of the tractor 5 can be judged to be appropriate by the amount soil that is being thrown against the shields 50. If a large amount of soil is being thrown against the shields 50 which is visible to an operator, then the tractor 50 is being driven too slowly and the speed of the tractor should be increased. Alternatively, if a large amount of soil is being thrown against the shields 50, the rotational speed of the auger can be reduced whilst maintain the speed of the tractor 50.

Figure 6:
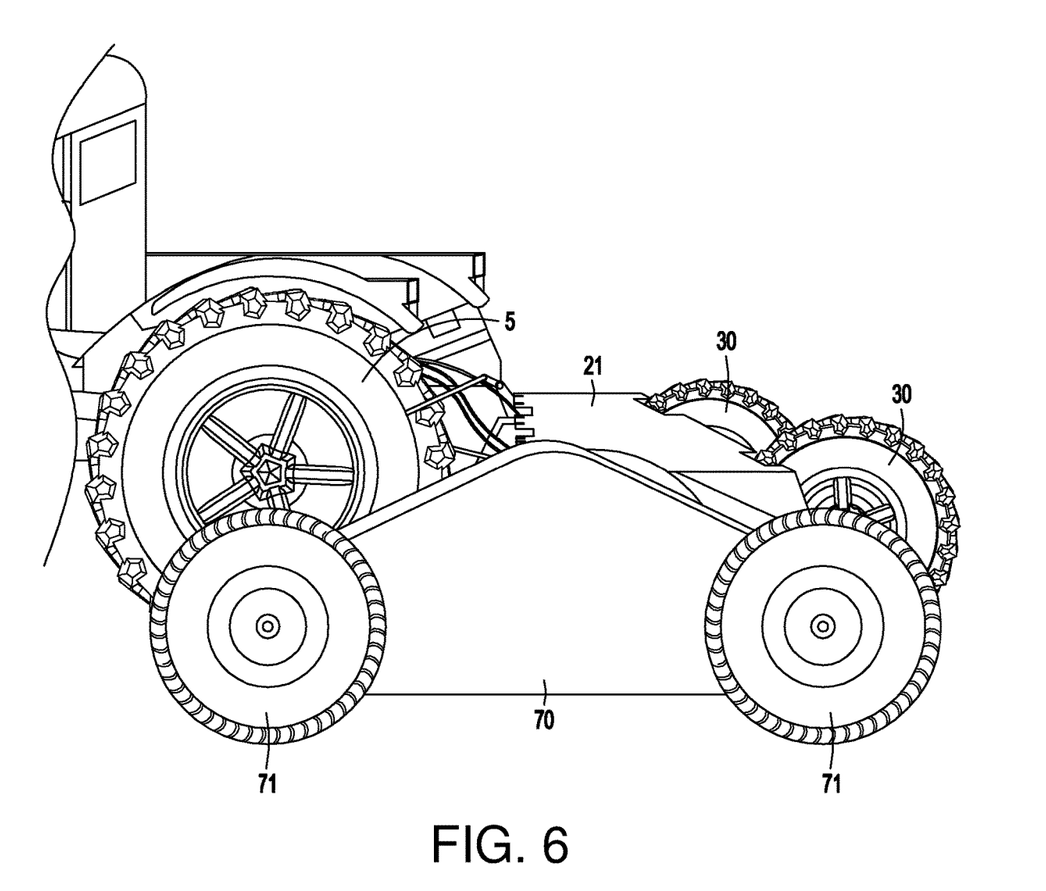
FIG. 6 is a perspective view of the drive mechanism according to a an second embodiment of the invention.
Figure 7:
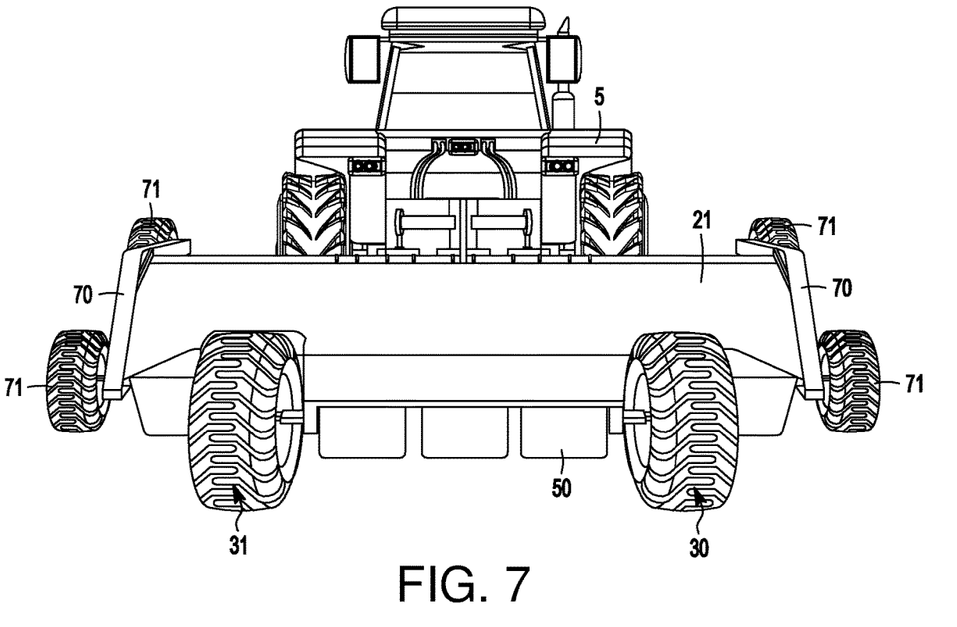
FIG. 7 is a perspective view of the drive mechanism according to a second embodiment of the invention.

FIGS. 6 and 7 show a second embodiment of the invention. The second embodiment of the invention is similar to the first invention. For example, the augers 40 are located in the same position and driven in the same manner. Accordingly, like numerals are used to describe like components.

In this second embodiment, the frame 21 of the body 20 is pivotally mounted to two casings 70 which are used to mount two sets of support wheels 71. The two casings 70 are pivotally mounted to respective ends of the central member 22. The two support wheels 71 on each casing are in a fixed spaced relationship to each other.

In use, the casing 70 with support wheels 71 are positioned outside the track on the desired soil level. As the wheel track renovator is towed along the track, the packing wheels 30 move up and down when following the contour of the filled track. If the packing wheels 30 move up due to overfilling of the tracks, this causes the frame 21 to move upwardly and pivot causing the augers 40 to reduce the amount of soil that the augers 40 shave from the ground on the sides of the tracks. Similarly, if the packing wheels 30 move down due to under-filling of the tracks, this causes the frame 21 to move downwardly and pivot causing the augers 40 to increase the amount of soil that the augers 40 shave from the ground on the sides of the tracks.

In an alternative embodiment, the frame 21 may include a top linkage (not shown) which is operatively attached to a draft control (not shown) of the tractor 5. If the packing wheels 5 rise, this causes the frame 21 to pivot causing the draft control to override lift cylinders (not shown) of the tractor 5 to raise the frame 21. This reduces the amount of soil that the augers 40 shave reducing overfilling of the tracks. Similarly, if the packing wheels 5 drop, this causes the frame 21 to pivot causing the draft control to override lift cylinders (not shown) of the tractor 5 to lower the frame 21. This increases the amount of soil that the augers 40 shave reducing under-filling of the tracks.

In some embodiments, the wheel track renovator can be configured, for example using hydraulics, so the body can be tilted in order to allow the wheel track renovator to operate in various conditions such as on a cambered road.

It should be appreciated that various other changes and modifications may be made to the embodiment described without depart from the spirit or scope of the invention.

The invention claimed is:

1. A wheel track renovator for filling a track with soil adjacent to the track, the wheel track renovator comprising:
a body attachable to a vehicle;
at least one auger mounted to the body in an orientation transverse to the track, the at least one auger including a pair of spaced-apart, opposing helical screws defining a center space therebetween, the opposing helical screws being operable to engage the soil adjacent to the track as the body moves longitudinally over the track;
at least one drive connected to the at least one auger to rotationally drive the opposing helical screws of the at least one auger to move the soil adjacent to the track toward and into the track positioned below the center space between the opposing helical screws; and
at least one smoothing device located in the center space between the opposing helical screws, the smoothing device operable to smooth the soil longitudinally along the track, and wherein the smoothing device comprises a series of paddles that extend outwardly from a shaft of the at least one auger at the center space between the pair of screws.

2. The wheel track renovator of claim 1, the body including a frame to which are mounted the at least one auger.

3. The wheel track renovator of claim 1, the body including a pair of packing wheels.

4. The wheel track renovator of claim 2, the body including a first pair of support wheels.

5. The wheel track renovator of claim 4, wherein the support wheels are fixed in position with respect to the frame.

6. The wheel track renovator of claim 1, wherein each of the at least one auger is angled perpendicularly with the direction of travel.

7. The wheel track renovator of claim 1, where each of the at least one auger is angled at 30, 45 or 60 degrees with respect to the direction of travel.

8. The wheel track renovator of claim 1, wherein in the pair of screws, a first screw is counter-clockwise screw whilst a second screw is a clockwise screw.

9. The wheel track renovator of claim 1, wherein in the pair of screws, a first screw and a second screw are clockwise screws or counter-clockwise screws.

10. The wheel track renovator of claim 1, wherein the drive is a motor.

11. The wheel track renovator of claim 10, wherein the motor is a hydraulic drive.

12. The wheel track renovator of claim 1, including a prickle chain attached to and located behind the body.

13. The wheel track renovator of claim 1, further comprising:
two casings pivotally mounted to the body at opposing ends of the at least one auger, each casing fixedly supporting two support wheels; and
two packing wheels mounted to respective packing wheel arms, the packing wheel arms fixedly extending rearwardly from the body,
wherein, in use, the support wheels are positioned outside the track on a desired soil level, and
wherein vertical movement of the packing wheels pivotally displaces the opposing helical screws of the at least one auger, to thereby at least partially control the filling of the track.

14. A method of filling in wheel tracks with soil adjacent to the tracks, the method comprising the steps of:
moving soil adjacent to both sides of a track into the track using at least one mechanically rotated auger, the at least one mechanically rotated auger having two spaced-apart opposing helical screws defining a center space therebetween and being configured to move the soil toward and into the track positioned below the center space; and
longitudinally smoothing the soil along the track using a smoothing device, the smoothing device being located in the center space between the opposing helical screws, and wherein the smoothing device comprises a series of paddles that extend outwardly from a shaft of the at least one auger at the center space between the pair of screws.

* * * * *